3,413,401
METHOD AND APPARATUS FOR MELTING
METALS BY INDUCTION HEATING
Paul W. Dillon and Charles G. Robinson, Sterling, Ill., assignors to Northwestern Steel and Wire Company, Sterling, Ill., a corporation of Illinois
Filed Feb. 2, 1966, Ser. No. 524,556
16 Claims. (Cl. 13—9)

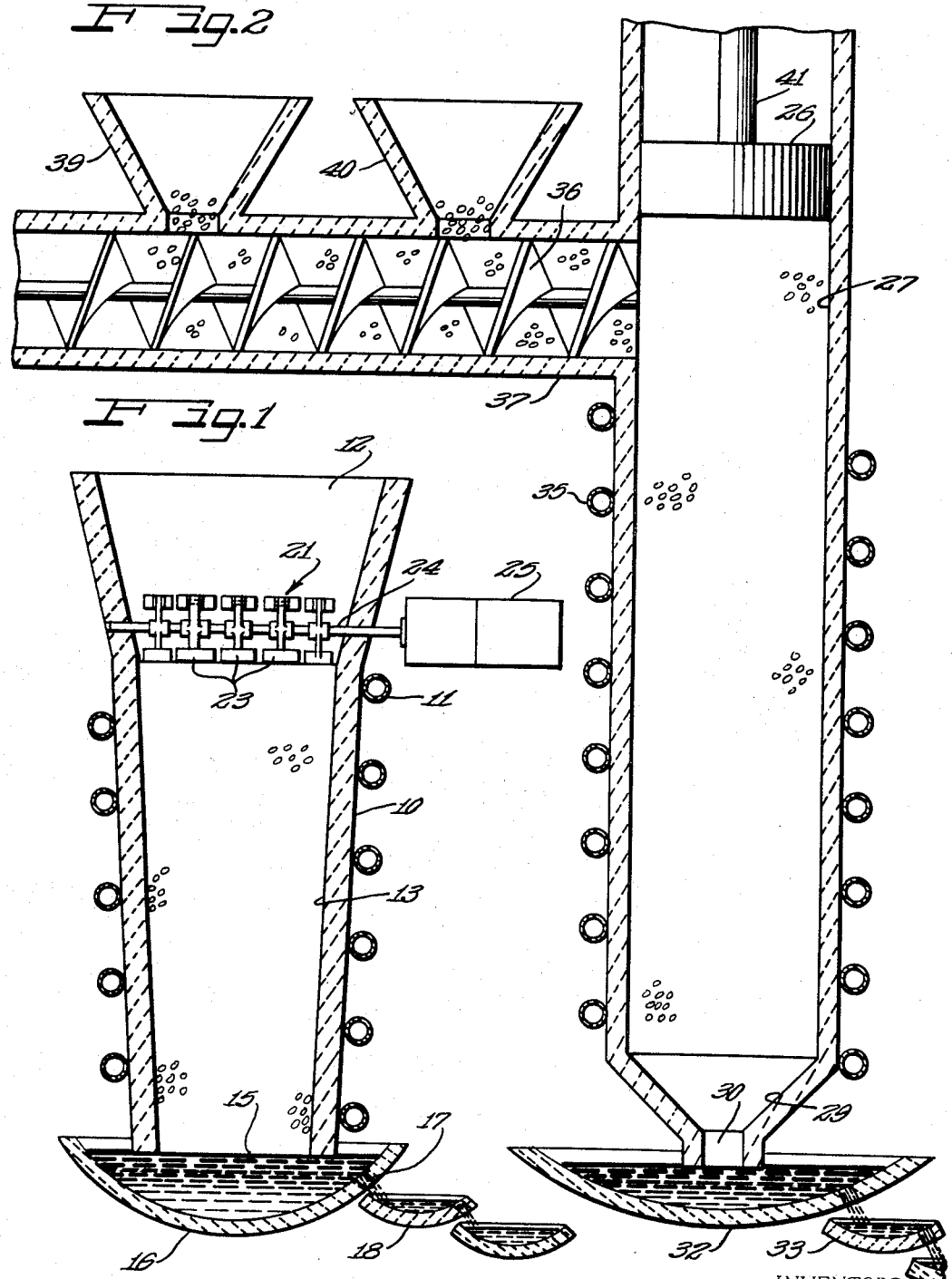

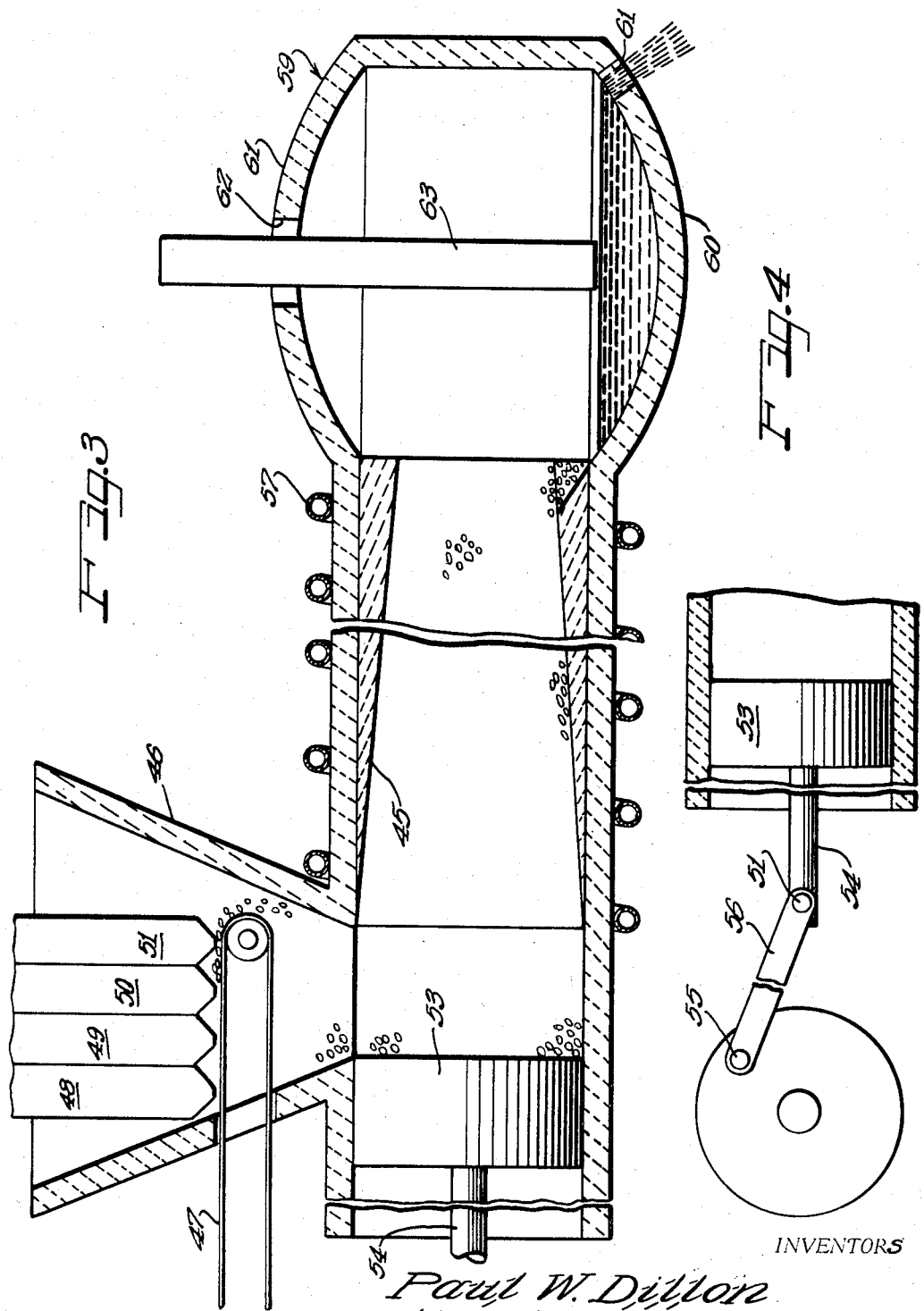

This invention relates to an improved method and apparatus for melting a metallic charge and more particularly relates to an improved method and apparatus for melting a metallic charge by induction heating.

Heretofore, induction heating has been used for heating ingots and even for melting small heats of special alloys. In such heating and melting applications, high frequency power, usually from a motor generator is supplied to a coil surrounding an ingot or a crucible containing a charge to be melted. The crucible containing the charge acts as a susceptor and the resulting eddy currents in the charge produce the heat required for heating and melting. In the prior art induction melting processes, the melted materials are usually of a high purity and no slag is formed and no refining is attempted.

It has been found from these prior heating and melting applications that induction melting, due to the high speed of melting is particularly adapted for continuous melting operations of scrap or pellets with a resultant increase in the speed of melting and simplicity in the melting structure.

A principal object of the present invention, therefore, is to improve upon the melting of ore, scrap and the like by continuously melting the charge in an open ended chute by induction heating, in which the eddy currents induced in the charge produce the heat for melting.

Another object of the invention is to improve upon the continuous melting of ore, scrap and the like by introducing the ore in an open ended chute and melting the charge of ore by induction heating as it passes along the chute.

Another object of the invention is to provide a new and improved melting process particularly adapted for the continuous melting of iron ore, scrap and the like which consists in introducing a charge of more ore or scrap in an open ended chute than is melted, compacting the charge and producing the heat for melting by the inducing of eddy currents in the charge.

Another object of the invention is to provide an improved apparatus for melting ferrous metals, in the form of an open ended chute converging toward its discharge end and formed from a non-conducting and non-magnetic material, and encircled by a high frequency induction coil, energizable to induce eddy currents in the ore and produce the heat for melting.

A further object of the invention is to provide a novel and improved form of continuous melting apparatus for ferrous ores and metals in the form of an open ended chute having compacting means adjacent the inlet to the chute and having a reduced diameter outlet accommodating the compacting of the ore in the chute and the melting of the ore by induction heating.

Still another object of the invention is to simplify the making of steel and the like by electric heating by providing an induction melting apparatus in the form of a chute encircled by a high frequency induction coil and terminating into an electric arc melting vessel, and supplying melted ore to the electric arc vessel for the direct and continuous making of steel and the like.

These and other objects of the invention will appear from time to time as the following specification proceeds and with reference to the accompanying drawings wherein:

FIGURE 1 is a diagrammatic sectional view of a form of induction melting apparatus constructed in accordance with the principles of the present invention;

FIGURE 2 is a diagrammatic sectional view of a modified form of induction melting apparatus from that shown in FIGURE 1;

FIGURE 3 is a diagrammatic sectional view of still another form of apparatus readily adapted to the continuous making of steel and the like; and FIGURE 4 is a diagrammatic view showing a form of compactor that may be used for compacting the ore.

The principles of the present invention are applicable to heating and melting ferrous ores and metals including pellets, scrap steel as well as high-purity raw materials in which eddy currents can be inducted in the charge to provide the heat for melting by the energization of a high frequency induction coil encircling the charge.

A general design of one form of melting vessel which may be used to carry out the invention is shown in FIGURE 1 as being a vertical chute 10 converging toward its discharge end. The chute 10 may be made from a non-magnetic material and is encircled by an induction coil, herein shown as being a water-cooled coil 11. The chute or melting vessel may be made from a ceramic material or from various refractories or other materials which will withstand the high heat of melting and will not be susceptible to the high frequency charge induced by the induction coil 11. The induction coil 11 may be energized by high-frequency power, which may be a motor generator (not shown). The coil 11 is shown as surrounding the chute 10, which acts as a susceptor. The resulting eddy currents in the charge within the chute produce the heat required for melting.

The chute 10 may be round or rectangular, and as shown in FIGURE 1, has a converging hopper-like receiving end 12 terminating into an elongated vertical chute 13 converging toward an open discharge end 15 of the chute. The discharge end 15 of the chute is shown as terminating within an upwardly facing shallow sealing bowl 16, which may be made from a refractory material and has an outlet 17 through which the molten ore may flow to a run-off ladle 18, shown as being a double runoff ladle of a conventional form, in which the slag is collected in one ladle and the molten metal flows from this ladle to a second ladle, from which it may flow for casting for further use.

The hopper-like receiving end 12 of the chute is diagrammatically shown as having a hammer mill 21 extending thereacross and including a plurality of hammers 23 of a conventional form, for continually compacting the ore or scrap as introduced into the chute 13. The hammers are diagrammatically shown as being mounted on a shaft 24, suitably driven from a motor and speed reducer 25. The hammer mill construction shown, is shown for illustrative purposes only and may be of any well known form.

It should be understood that the purpose of the hammer mill is solely to compact the ore or scrap and that various compacting means may be used, such as a reciprocating piston 26 as shown in the modified form of the invention illustrated in FIGURE 2 or any other suitable form of compacting means.

The form of the invention shown in FIGURE 1 is particularly adapted for pelletized iron ore and commonly called pellets. Such pellets contain approximately sixty-seven percent iron ore and are introduced into the chute through the hopper-like receiving end 12 thereof, and are confined to the chute and restricted to accommodate compacting thereof by the converging walls of the chute converging from the receiving to the discharge end of the chute and opening to the sealing bowl 16. The pellets, as introduced to the level of the hammer mill 21 are then compacted by the rotating hammers 23, as pellets are continued to be introduced into the chute in a greater quantity than melted. The water-cooled induction coil 11 being energized, then sets up eddy currents in the compacted pellets, to generate the heat for melting the pellets.

In this form of the invention, the introduction of more pellets into the chute than are melted and the continuous compacting of the pellets as introduced, effects a continuous operation of melting and flow of molten ore from the bottom of the chute into the sealing bowl 16 from which the molten ore flows through the outlet 17 to the double run-off ladle 18, for use or further processing.

With the present form of the invention, limestone may be added with the pellets or may be added in the sealing bowl 16, to give the slag the basicity required to retain the phosphorous in the slag, in a manner commonly employed in the reduction of iron ore.

In the form of the invention illustrated in FIGURE 2, the chute 27 is shown as being generally cylindrical and of uniform diameter for a major portion of the length of the chute. The chute converges at its lower end into a frusto-conical converging wall portion 29, terminating into a reduced diameter outlet spout 30 extending within a sealing bowl 32, like the sealing bowl 16. The sealing bowl 32 then discharges the molten metal and slag into a double run-off ladle 33 separating the molten ore from the slag. The chute 27 may be made from a ceramic material or from a suitable refractory material which will act as a susceptor, and will not be susceptible to the eddy currents created by the energization of a high frequency induction coil 35, encircling the chute beneath a feed conveyor 36.

The feed conveyor 36 is shown as being a conventional form of screw conveyor rotatably mounted within a tube 37, opening through a wall of the chute 27 and extending at right angles with respect to said chute. A hopper 39 for iron ore, which may be in the form of pellets, opens into the tube 27 to supply ore to the tube to be conveyed to the chute 27. A second hopper 40 opens into the tube 37 and is spaced closer to the chute 27 than the hopper 39 and may contain limestone for mixing with the pellets, scrap, or other ore, to create the required slag in the molten metal discharged to the sealing bowl 32.

In this form of the invention the reciprocable piston 26 serves to compact the ore and limestone, where limestone is added with the ore, to provide the compactness to induce eddy currents in the ore an thereby effect melting of the ore upon energization of the induction coil 35.

The compacting piston 26 is shown in FIGURE 2 as being on the end of a piston rod 41. The piston rod 41 may be connected to a crank (not shown) through a link (not shown) to be reciprocably moved along the chute 27 upon rotation of the crank as in the form of the invention shown in FIGURE 3. The piston rod 41, of course, may be extensible from a cylinder (not shown), in which fluid under pressure is alternately admitted to opposite ends of the cylinder, to drive the piston 26 at compacting strokes to compact the pellets, scrap or other material being melted in the chute 27. It may also be operated by a rack and pinion or by any other suitable operating device.

The operation of the process of the form of the invention shown in FIGURE 2 is similar to that shown in FIGURE 1, that is, the pellets or scrap or other forms of iron ore are introduced into the chute 27 along the upper end thereof by operation of the screw conveyor 36 until the charge reaches a level where it can be compacted by the compacting piston 26. The ore is then compacted by said piston as continually introduced into the chute by the screw conveyor 36. At the same time the induction coil 35 is energized to induce eddy currents in the charge to effect melting of the charge by the heat induced by energization of the induction coil 35. The bowl 32 may collect and retain the molten ore to the chute to flow through the outlet thereof to the double run-off ladle 33.

In the form of the invention illustrated in FIGURES 3 and 4 the vertical chute has been replaced by a horizontally extending chute 45, which tapers toward its discharge end and may either be round or rectangular in cross section. A hopper 46 opens through the top of the chute, at its receiving end, for supplying ore, scrap and refining materials into the chute. As shown herein a conveyor 47 extends into the hopper 46 beneath a series of vertically extending bins 48, 49, 50 and 51, suitably mounted within the hopper, in discharge relation with respect to the conveying run of the conveyor 47. The hopper 46 may thus discharge iron ore in the form of pellets onto the conveyor 47 and the horizontal chutet 45, while the hoppers 49, 50 and 51 may supply carbon, lime and manganese or other reducing and refining materials into the chute 45. A compacting piston 53 is shown as being reciprocably movable along said chute beneath the hopper 46 for compacting the material discharged thereinto. As shown in FIGURE 4, the piston 53 is on the end of a piston rod 54. A crank pin 55 is pivotally connected to a link 56 connected to the end of the piston rod 54 by a pivot pin 57, to reciprocably drive the piston 53 and compact the material in the chute 45 to provide a charge having sufficient density for the inducing of eddy currents therein, upon high-frequency power energization of an induction coil 57, encircling the chute 45.

The chute 45 terminates into an electric melting vessel, diagrammatically shown in FIGURE 3 as being an electric arc furnace 59 having a hearth 60 and a roof 61 with an opening 62 in the roof to receive an electrode 63. The electric melting vessel 59 may be any conventional form of furnace and is shown as being a direct arc furnace although it need not be a direct arc furnace and may be a submerged arc furnace. The hearth 60 has an outlet 61 through which the charge may be tapped and flowed to a ladle, or other receptacle for the molten charge.

The electrode 63 may be energized through the secondary circuit in the transformer (not shown) in a conventional manner, in which a reactance (not shown) is included in the primary circuit of the transformer, to give stability to the circuit and to limit the current when the electrode makes contact with the charge.

In this form of the invention the iron ore and scrap along with the required raw refining materials may be supplied from the bins 48, 49, 50 and 51 directly onto the conveyor 47 discharging the material in the converging chute 45. As in the other forms of the invention, a greater charge is introduced than melted and the charge introduced, confined by the converging wall of the chute, is compacted along said chute by the reciprocating piston 53 to give the charge the density to enable eddy currents to be induced therein to produce the heat required for melting upon energization of the coil 57. The melted charge may thus continuously flow into the electric melting vessel 59 and the operation of refining the charge into steel is completed in said electric melting vessel in a conventional manner. Limestone may either be added to the charge through a bin in the hopper 46 or may be added in the furnace. Other reducing and alloying materials may also be added either in the hopper 46 or in the furnace as required.

In the continuous melting process described, gases will be generated in the melting or refining process. These gases may be circulated back to the inlet end of the chute 45 to preheat the charge and facilitate the melting thereof by induction melting.

It should also be understood that the ferrous metallics introduced into the chute may be pellets and scrap, prepared scrap mixed with pellets, turnings, mill scale mixed with scrap, and that the reducing raw materials may be of various forms conventionally used in the reduction of ore, of the required chemical composition, to produce iron or steel of the desired consistency and that the chemical reactions are the same as in the conventional electric melting, so need not herein be described.

It may further be seen that the chute 45 may take the place of the usual blast furnace and directly supply the melted charge to the electric furnace for refining into steel.

While we have herein shown and described several forms in which the invention may be embodied, it may readily be understood that various other variations and modifications in the invention may be attained without departing from the spirit and scope of the novel concepts hereof.

We claim as our invention:

1. A method of continuously melting meltable metals comprising the steps of:
 providing a melting chute of a non-conducting non-magnetic material having an inlet at one end thereof and a reduced cross-sectional area outlet at the opposite end thereof,
 introducing a meltable metal into the chute to a compacting level and continuing the introduction of meltable metal into the chute and continuously exerting an external force on the meltable metal as introduced and thereby compacting the meltable metal,
 melting the meltable metal by the eddy currents in the charge induced by high frequency induction power,
 and continuously flowing the melted metal from the discharge end of the chute.

2. The method of claim 1,
 wherein more meltable metal is introduced than is melted and the compacting step is a continuous step during the introduction of meltable metal into the chute.

3. The method of claim 1,
 wherein the chute is made from a ceramic material and extends vertically, and
 wherein the ore is initially introduced into the chute to a compacting level and thereafter is continuously compacted as introduced in the chute.

4. The method of claim 1,
 wherein the chute extends horizontally,
 wherein an electric melting vessel has communication with the discharge end of the chute,
 wherein the ore introduced into the chute is continuously compacted and then melted by the eddy currents induced in the charge by high frequency induction power,
 and wherein the melted charge flows directly to an electric melting vessel and is melted by energizing a circuit including the electrode of the melting vessel and the metallic charge.

5. A method of supplying a melted charge to an electric arc melting vessel having at least one electrode comprising the stpes of:
 providing a melting chute having a receiving end and an opposite discharge end in direct communication with the electric arc melting vessel,
 introducing ore into the chute and compacting the ore so introduced,
 melting the ore by the eddy currents induced in the charge by high frequency induction power,
 flowing the melted ore to the electric arc melting vessel all while energizing a circuit including the electrode and the metallic charge to form a high density arc zone of elevated temperature,
 and then withdrawing the molten charge from the electric arc metling vessel.

6. The method of claim 5,
 wherein the melting chute extends horizontally and is encircled by a high frequency induction coil and is restricted from its receiving to its discharge end.

7. An apparatus for melting ore comprising:
 an elongated chute of a non-conducting and non-magnetic material,
 an inlet into said chute at one end thereof,
 an outlet from the opposite end of said chute,
 means within said chute adjacent said inlet for compacting ore introduced into said chute,
 and a high frequency induction coil encircling said chute and energizable to effect melting of the charge by the induction of eddy currents in the charge.

8. The structure of claim 7,
 wherein the chute is vertical and converges from its receiving to its discharge end.

9. The structure of claim 8,
 wherein the chute is made from a ceramic material.

10. The structure of claim 9,
 wherein a sealing basin extends beneath and upwardly over the discharge end of the chute, and seals the discharge end of the chute and accommodates the continuous flow of molten metal for further treatment.

11. The structure of claim 10,
 wherein the compacting means comprises a hammer mill at the receiving end of the chute.

12. The structure of claim 7,
 wherein the chute is made from a ceramic material, and wherein the compacting means comprises a piston reciprocably movable along the chute.

13. The structure of claim 7,
 wherein the chute is made from a ceramic material and extends vertically,
 wherein conveying means is provided for introducing a charge into the chute adjacent the upper end thereof,
 wherein the discharge end of the chute is restricted,
 and wherein the compacting means comprises a piston at the receiving end of the chute and reciprocably movable therealong.

14. The structure of claim 13,
 wherein the discharge end of the chute terminates into a sealing basin sealing the discharge end of the chute and accommodating the continuous flow of molten metal for further treatment.

15. The structure of claim 7,
 wherein the chute extends horizontally and has an inlet through the wall thereof, adjacent one end thereof,
 wherein the compacting means comprises a piston reciprocably movable along the receiving end portion of the chute,
 and wherein an electric arc melting vessel forms a continuation of the discharge end of the chute.

16. The structure of claim 15,
 wherein the chute converges from its receiving to its discharge end and is made from a ceramic material.

References Cited

UNITED STATES PATENTS

| | | | |
|---|---|---|---|
| 1,318,164 | 10/1919 | McConnell | 75—13 |
| 2,359,578 | 10/1944 | Payne | 13—26 |
| 2,362,701 | 11/1944 | Koehring | 219—10.65 X |
| 2,754,346 | 7/1956 | Williams | 13—26 X |
| 3,206,301 | 9/1965 | Daubersy | 75—13 |
| 3,372,223 | 3/1968 | Menegoz et al. | 13—9 |

BERNARD A. GILHEANY, *Primary Examiner.*

H. B. GILSON, *Assistant Examiner.*